US007948499B2

(12) United States Patent
Ramanath et al.

(10) Patent No.: US 7,948,499 B2
(45) Date of Patent: May 24, 2011

(54) COLOR CONTROL ALGORITHM FOR USE IN DISPLAY SYSTEMS

(75) Inventors: Rajeev Ramanath, Plano, TX (US); Harold E. Bellis, II, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 954 days.

(21) Appl. No.: 11/776,847

(22) Filed: Jul. 12, 2007

(65) Prior Publication Data

US 2009/0015526 A1 Jan. 15, 2009

(51) Int. Cl.

| | |
|---|---|
| ***G09G 5/00*** | (2006.01) |
| ***G09G 5/02*** | (2006.01) |
| ***G09G 5/10*** | (2006.01) |
| ***H04N 7/18*** | (2006.01) |
| ***H04N 9/73*** | (2006.01) |
| ***H04N 1/46*** | (2006.01) |
| ***G06K 9/34*** | (2006.01) |
| *H04N 9/31* | (2006.01) |
| *G06F 3/08* | (2006.01) |
| *G06K 9/40* | (2006.01) |

(52) U.S. Cl. ........ 345/581; 345/589; 345/601; 345/690; 345/204; 348/655; 348/68; 348/71; 348/760; 358/504; 358/509; 358/518; 382/162; 382/167; 382/254; 382/274

(58) Field of Classification Search .................. 345/581, 345/589–591, 600–601, 549, 22, 207, 690, 345/204, 63, 77, 83–88, 102; 348/651, 655, 348/653, 656, 742, 749, 649; 358/504, 509, 358/515–518; 382/162–167, 254, 274; 315/149–151

See application file for complete search history.

(56) References Cited

U.S. PATENT DOCUMENTS

| | | | | |
|---|---|---|---|---|
| 6,229,626 | B1 * | 5/2001 | Boll | 358/1.9 |
| 2004/0196250 | A1 | 10/2004 | Mehrotra | |
| 2006/0104058 | A1 * | 5/2006 | Chemel et al. | 362/231 |
| 2006/0170880 | A1 | 8/2006 | Dambach | |
| 2006/0279710 | A1 | 12/2006 | Tani | |
| 2006/0280360 | A1 | 12/2006 | Holub | |
| 2007/0024529 | A1 * | 2/2007 | Ben-David et al. | 345/32 |
| 2007/0208983 | A1 * | 9/2007 | Sudhakar et al. | 714/732 |
| 2007/0216772 | A1 * | 9/2007 | Xu et al. | 348/189 |
| 2009/0190045 | A1 * | 7/2009 | Endo et al. | 348/760 |

OTHER PUBLICATIONS

U.S. Appl. No. 11/588,921, filed Oct. 27, 2006, Pettitt et al.
U.S. Appl. No. 11/741,972, filed Apr. 30, 2007, Ramanath et al.

* cited by examiner

*Primary Examiner* — Wesner Sajous
(74) *Attorney, Agent, or Firm* — Charles A. Brill; Wade James Brady, III; Frederick J. Telecky, Jr.

(57) ABSTRACT

A color control algorithm compensates variations in the display system so as to maintain color consistency in the projected images on the screen by constructing a color mapping table of the display system to include effects due to the variations and during image display applications, generating inputs of the color mapping table to include the effects due to the variations in the display system.

25 Claims, 3 Drawing Sheets

COLOR CONTROL ALGORITHM FOR USE IN DISPLAY SYSTEMS

CROSS-REFERENCE TO RELATED CASES

This U.S. patent application is related to the following U.S. patent applications: "System and Method for Computing Color Correction Coefficients" Ser. No. 11/588,921 filed Oct. 27, 2006, "Managing the Color Temperature for a Light Source Array" Ser. No. 11/219,598 filed Sep. 1, 2005, and "Projection Illumination Using Multiple Controlled Light Emitters having Individual Wavelengths" Ser. No. 60/882,637 filed Dec. 29, 2006, the subject matter of each being incorporated herein by reference in their entirety.

TECHNICAL FIELD

The technical field of this disclosure relates to the art of display systems, and more particularly, to the art of color control in display systems employing spatial light modulators.

BACKGROUND OF THE DISCLOSURE

In recent years, solid-state light illuminators, such as LASERs and light-emitting-diodes (LEDs), have drawn attention as alternative light sources to traditional light sources, such as arc lamps, for use in display systems due to many advantages, such as compact size, greater durability, longer operating life, and lower power consumption. As a way of example, FIG. 1 diagrammatically illustrates a typical display system using solid-state light sources.

Referring to FIG. 1, illumination system 102 has multiple solid-state illuminators for providing light of different colors. The light is directed to light valve 104, such as a spatial light modulator, that modulates the incident light based on image data 114, such as bitplane data. The bitplanes are derived from desired images 106 based on the output of color mapping table 110, which converts input pixel data into output pixel data associated with a pre-determined sequence of color duty cycles. The sequence of duty cycles often has more colors than the colors provided by the illuminators of the display system by overlapping the ON-time of the illuminators so as to get the most from the illuminators as possible. As a consequence, the full-on white can be increased through overlapping of on-time of the illuminators. In one example, assuming the input to the color mapping table can be pixel data for red, green, and blue colors, the output of the color mapping table can have pixel data for red, green, blue, yellow, cyan, magenta, and other suitable colors or bands of wavelengths, such as white light.

Based upon the output pixel data from the color mapping table, bitplanes 114 are derived. At a time when a particular color of light (e.g. red color) illuminates the light valve, the corresponding bitplane is used to determine the states of individual pixels of the light valve while the time duration of the states is determined by the bitplane weight. The modulated light is projected onto a display target so as to produce the color image component. The calorimetric properties of the produced color image component on the display target are thus determined by the bitplane and the color of the light illuminating the light valve. However, the produced color image component on the display target may not have consistent calorimetric properties due to variations of the solid-state light illuminators.

It has been observed that, regardless of the widely embraced superior properties over traditional light sources, solid-state light illuminators, such as LEDs may suffer from calorimetric variations due to environment changes. Specifically, the light emission intensity of a typical solid-state light illuminator may vary with the temperature changes of the light emitting element even with fixed electronic current. On the other hand, the color mapping table (110), such as the a three-dimensional lookup as implemented in BrilliantColor™ is often built for a "golden" set of parameters including a choice of duty cycles, specific illuminators, and electronic current levels used for driving the specific illuminators. Changes in duty cycles, illuminators, or electronic current levels will cause output colors from the color mapping table offset from their "ideal" values that correspond to the "golden" set. For example, a variation in the duty cycle of the illuminators will cause changes in the duty cycles of color light illuminating the spatial light modulator, which in turn, results in variations of the colors of the produced images on the screen.

SUMMARY

As an example of the invention, a method for use in a display system is disclosed herein. The method comprises: obtaining a calorimetric property characterizing the display system and a color intensity characterizing light illuminating a light valve of the display system; deriving an image data based on an image to be produced, the obtained calorimetric property and the color intensity; and producing the image using the image data.

As another example, a method for use in constructing a color mapping table that is usable in an imaging system is disclosed herein. The method comprises: measuring a first set of calorimetric properties characterizing the set of illuminators of the imaging system and a first set of spectrums characterizing an image produced by the imaging system using the illuminators with the first set of calorimetric properties; measuring a second set of calorimetric properties characterizing the set of illuminators of the imaging system and a second set of spectrums characterizing an image produced by the imaging system using the illuminators with the second set of calorimetric properties; estimating a set of parameters based on the measured first and second sets of calorimetric properties and spectrums; and generating the color mapping table based on the estimated set of parameters.

As yet another example, a display system is disclosed herein. The system comprises: an external calorimeter capable of measuring a calorimetric property of an illuminator of the display system; an internal sensor capable of measuring an intensity of a color of an image produced on a screen of the display system; a pre-processing unit having a set of input in connection with an image source, the external calorimeter, and the internal sensor for calculating a set of parameters for a color mapping table based on the measurements of the external calorimeter, the internal sensor, and an image to be produced; means in connection with an output of the color mapping table for deriving a set of bitplanes; and a light valve comprising an array of individually controllable pixels for displaying the bitplanes so as to generate the image on a screen.

DETAILED DESCRIPTION OF SELECTED EXAMPLES

In view of the foregoing, a color control algorithm is disclosed herein capable of compensating for variations in the display system so as to maintain color consistency in the projected images on the screen. The variations can include, but are not limited to, variations in operation environment of the solid-state illuminators (e.g. temperature variations and electrical current variations) and variations in duty cycles of the illuminators.

The compensation can be performed, during the color mapping table construction, on the set of table constructing parameters used for constructing the color mapping table without substantially changing the structure of the color mapping table such that the constructed color mapping table includes the effect due to the variations of the system (e.g. variations of illuminators and duty cycles). Once such color mapping table is built, the color mapping table need not to be modified; and single color mapping table can be sufficient for a display system even when the display system is to be operated in the presence of variations in illuminators, duty cycles, and other related factors. During a display application, parameters characterizing the illuminators and the desired image to be produced can be fed into the color mapping table that generates a set of output parameters, based on which bitplanes can be derived. The derived bitplanes can then be displayed by the light valve so as to produce the desired image. In the following, the above compensation scheme with the color mapping table will be discussed with reference to selected examples. It will be appreciated by those skilled in the art that the following discussion is for demonstration purpose, and should not be interpreted as a limitation. Instead, other variations within the scope of the examples to be disclosed in the following are also applicable.

Figure 1:
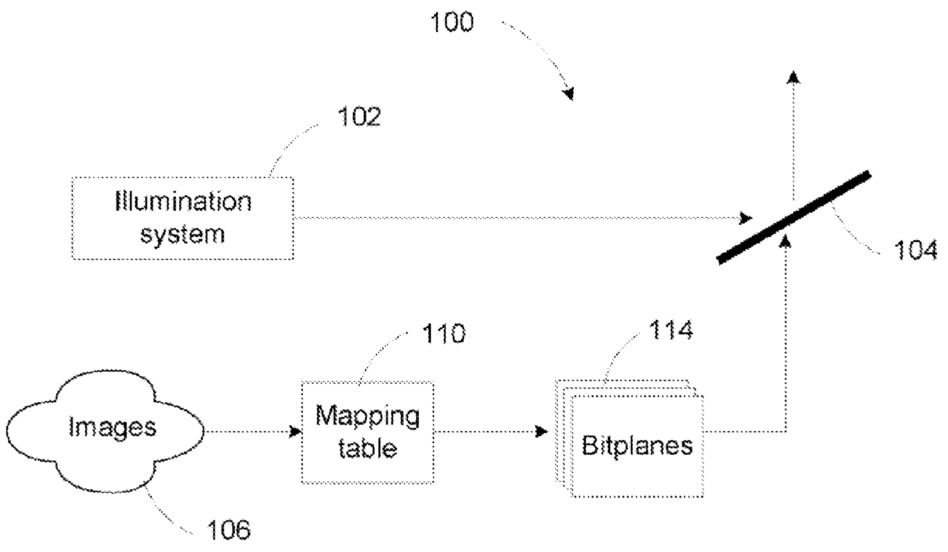
FIG. 1 (Prior Art)
FIG. 1 schematically illustrates an exemplary display system.
Figure 2:
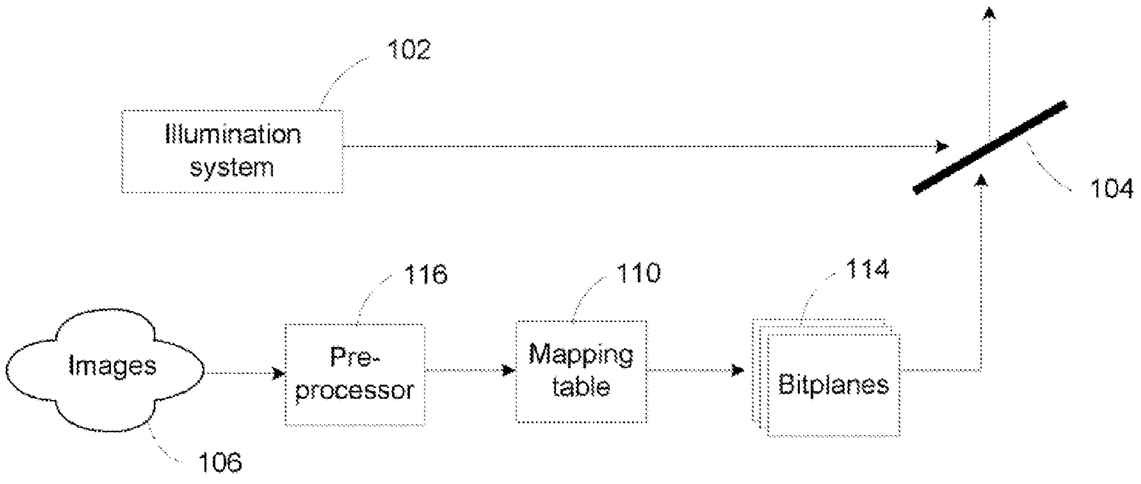
FIG. 2 schematically illustrates an exemplary display system employing a color correction mechanism.

By way of example, FIG. 2 schematically illustrates an exemplary display system that employs a color compensation mechanism. Referring to FIG. 2, the display system comprises illumination system 102, light valve 104, image source 106, pre-processor 116, color mapping table 110, and a bitplane generation module capable of generating bitplanes 114 based on the output of the color mapping table and the image to be produced. The bitplane generation module can be implemented in many ways, such as those set forth in U.S. Pat. No. 5,663,749 issued Sep. 2, 1997, U.S. Pat. No. 5,255,100 issued Oct. 19, 1993, U.S. Pat. No. 5,278,652 issued Jan. 11, 1994, and co-pending U.S. patent application Ser. No. 10/648,608 filed Aug. 25, 2003, the subject matter of each being incorporated herein by reference in their entirety. The illumination system (102) preferably, though not required, comprises an array of solid-state illuminators, such as LASERs, and LEDs. A wide range of other illuminators, such as arc lamps and single color illuminators (e.g. wavelength specific plasma lamps) can also be used. The illumination system may also comprise illuminators of different natures, such as a combination of a solid-state illuminator and an arc lamp. In one example, the solid-state illuminators are capable of emitting light of different colors, such as colors selected from red, green, yellow, white, and other suitable colors. Regardless of different illuminators, the number of colors of light emitted from the illumination system (and the number of illuminators of the illumination system) can be less, equal to, or more than the number of colors of light illuminating the light valve. For example wherein solid-state illuminators are used, more colors of light illuminating the light valve can be accomplished by overlapping the turn-on time of specific illuminators. Light valve 104 can be any suitable devices, such as a spatial light modulator (e.g. a micromirror-based spatial light modulator, a liquid-crystal display panel (LCD), a liquid-crystal-on-silicon (LCOS) based spatial light modulator, a silicon crystal reflective display panel, and an interferometric modulator, etc.) and other types of light valves, such as self-light emitting light valves (e.g. organic light-emitting diode displays and plasma panels). Different from the display illustrated in FIG. 1, the display system in FIG. 2 comprises pre-processor 116. The pre-processor comprises an input connected to the retrieved images to be produced and an output connected to the input of color mapping table 110, as shown in FIG. 2. The pre-processor is provided to accomplish multiple functions, one of which is to generate a set of parameters associated with a specific color image component (e.g. red color image component) that is to be displayed. The generated set of parameters include the effect due to possible variations of the illuminators and/or duty cycles and/or other related factors; and the generated set of parameters can then be used by the mapping table in displaying the specific color image component.

Figure 3:
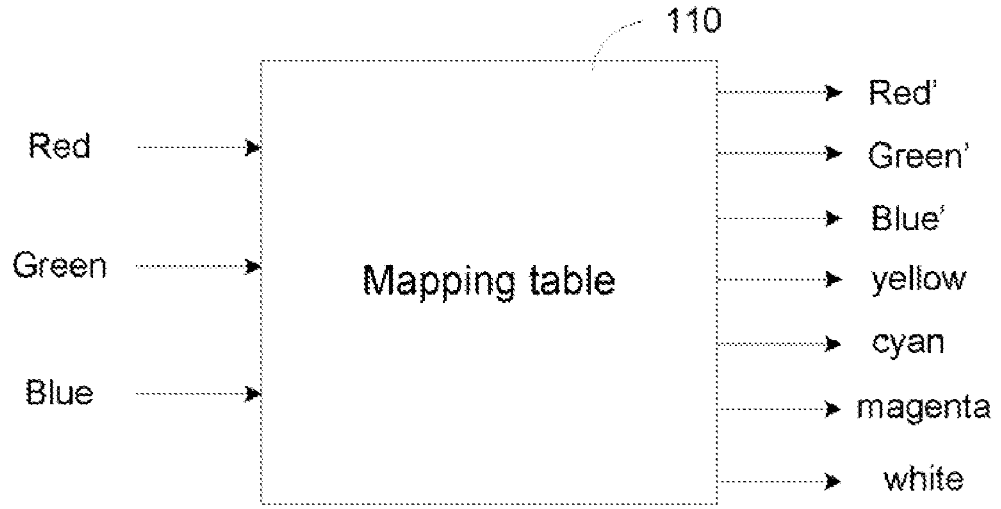
FIG. 3 schematically illustrates an exemplary color mapping table of the display system in FIG. 2.

The color mapping table (110) can be a two-dimensional lookup table, three-dimensional lookup table, such as a BrilliantColor™ table or other types of color mapping tables that are capable of converting a set of input color data, such as R, G, B data, into a set of output color data supported by the display system, such as R, G, B, W or R, G, B, Y, C, M, or other colors or combinations of colors. An exemplary color mapping table is schematically illustrated in FIG. 3. It is noted that that even though the color mapping table in FIG. 3 has input for Red, Green, and Blue color data; and outputs for Red, Green, Blue, Yellow, Cyan, Magenta, and white, it is only one of many possible examples. The color mapping table can have any combinations of input and output colors, preferably selected from red, green, blue, yellow, cyan, magenta, and white. The inputs and/or outputs of the color mapping table can also be in a luma-chroma space like YCbCr, YUV, YPbPr etc. In general, the input colors are determined by the color image components of the image to be produced; while the output colors are determined by the display system.

During the Color Mapping Table Construction

In the following description, scalars are denoted by italic non-boldface characters; vectors are denoted by lowercase boldface letters; and matrices are denoted by upper case boldface letters unless otherwise defined. For demonstration and simplicity purposes, the following discussion assumes that the input of the color mapping table comprises R, G, and B colors while the output of the color mapping table comprises R, G, B, Y, C, and M colors. It will be appreciated that the following discussion is for demonstration purpose, and should not be interpreted as a limitation. The input and output of the color mapping table can be any combinations of colors.

Figure 4:
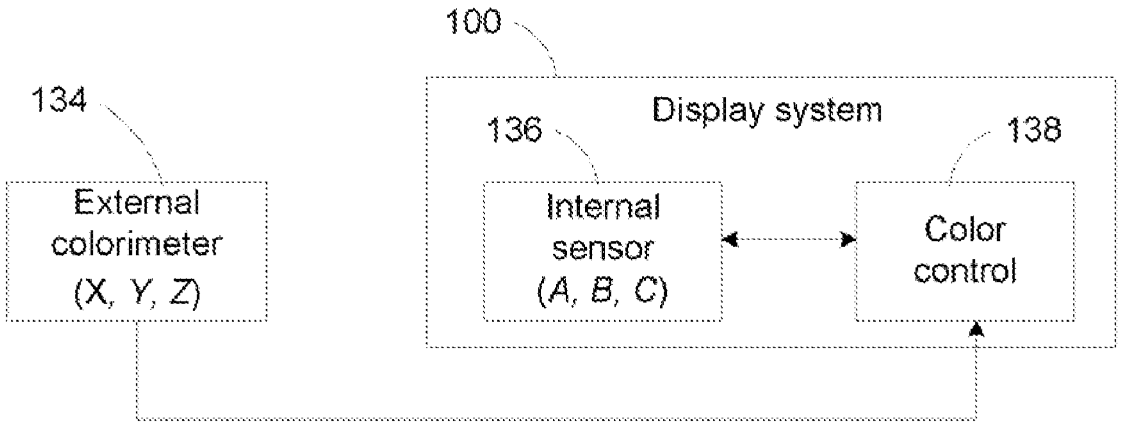
FIG. 4 illustrates an exemplary system usable for correcting colors

For constructing the color mapping table to include effects due to variations of the illuminators and/or duty cycles and other related factors, measurements of calorimetric properties of the display system (e.g. the calorimetric properties of produced images on the screen of the display system) and the relative color intensities of the light (e.g. color light) illuminating the light valve of the display system using the illuminators can be performed. An exemplary measurement setup for this purpose is schematically illustrated in FIG. 4. As an example, measurement of the calorimetric properties and the relative color intensities of the light can be performed during the color mapping table construction; and the correlations of the measurements (calorimetric properties of the display system and the color intensities of the light illuminating the light valve) can be correlated. During the image displaying applications, however, measurement of the relative intensities of color light illuminating the light valve may be sufficient; and the calorimetric properties of the display system can be obtained by estimation based on the measured relative intensities of colors of light and the correlation. In other examples, both measurements of the calorimetric properties of the display system and relative color intensities can be performed during the image displaying applications. As such, corresponding measurement devices, such as external calorimeters, which will be detailed in the following, for measuring the calorimetric properties of the display system may or may not be installed in display systems.

Referring to FIG. 4, external calorimeter 134 is provided to measure the calorimetric properties of the display system (e.g. the calorimetric properties of images on the screen); and the measured calorimetric data can be stored in a format of (X, Y, Z); where X, Y, Z are tristimulus values as defined in the CIE calorimetric system. Internal color sensor 136 is capable of measuring the intensity of color light illuminating the light valve; and the measured data can be stored in a format of (A, B, C), wherein A, B, C represent the intensities measured by the internal color sensor. During the color mapping table construction, measurements of the calorimetric properties of the display system and the color intensities of the light illuminating the light valve using the internal and external sensors can be correlated, for example, using a correlation function. With the correlation, one measurement can be estimated based on the other measurement and the correlation. Specifically, the calorimetric properties of the display system measured by the external calorimeter can be estimated based on the measurement of the internal sensor and the established correlation, which can be useful in the following image display applications, wherein external calorimeter can be omitted from the display system, though not required.

The external calorimeter and the internal sensor can be any suitable devices. Specifically, the external calorimeter can be any suitable spectroradiometers, such as calorimeters by Photo Research, Inc. The internal sensor can be any suitable devices, such as those from Hamamatsu, Inc., Honeywell, Inc., and Agilent, Inc. The internal sensor can be disposed at any suitable locations in the display system. For example, the internal sensor can be disposed at a location proximate to the spatial light modulator, or can be a functional member embedded on/in the spatial light modulator. Alternatively, the internal sensor can be disposed between the illumination system and the spatial light modulator, or can be disposed at a location between the spatial light modulator and the projection lens of the display system, or a location after the projection lens of the display system. With the measured (X, Y, Z) and (A, B, C), a set of parameters for constructing the color mapping table can be derived in many ways, one of which is illustrated in flow chart in FIG. 5.

Figure 5:
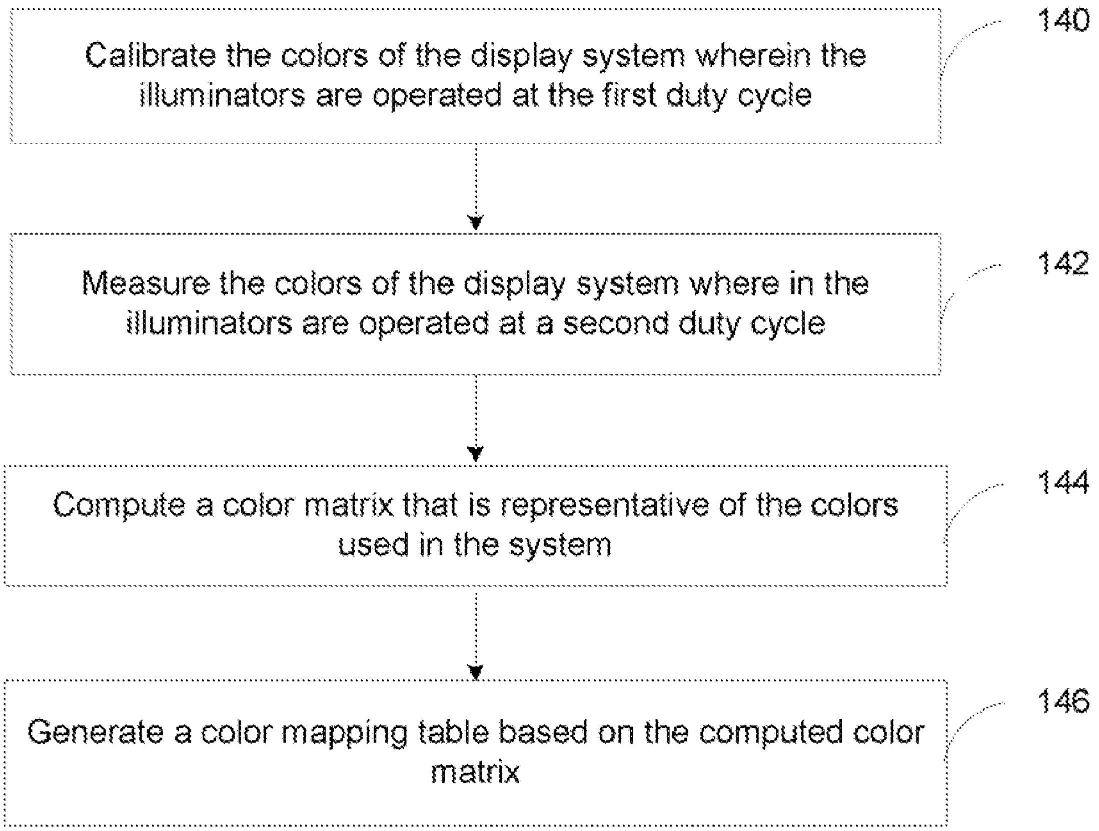
FIG. 5 is a flow chart showing the steps executed in performing an exemplary color control algorithm.
Figure 6:
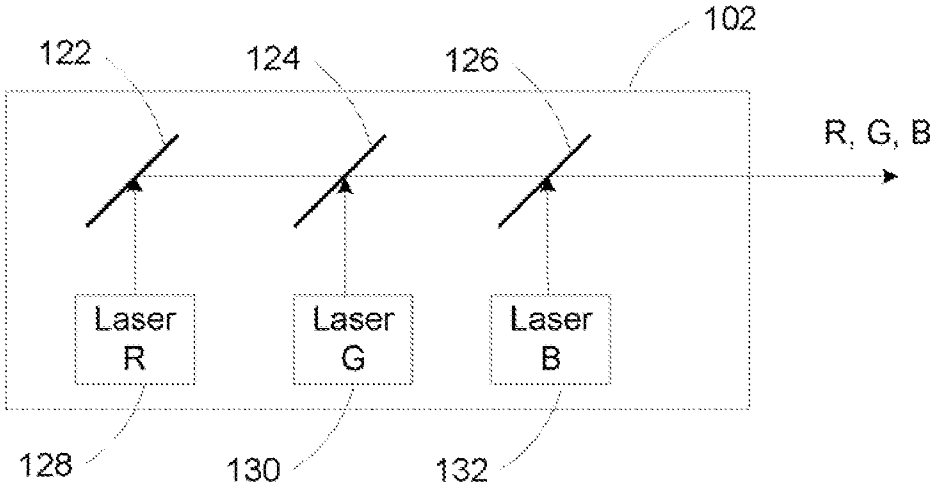
FIG. 6 schematically illustrates an exemplary illumination system of the display system in FIG. 2.

Referring to FIG. 5, color calibration for the display system using a specific set of illuminators that comprises illuminators capable of emitting red, green, and blue is performed (step 140). During the calibration, calorimetric properties of the illuminators are measured at the first duty cycle (calibration duty cycle), such as RGB duty cycle, and with specific electronic current levels for the illuminators. The measured calorimetric data can be stored in matrix A_cal expressed in equation 1. The electronic current levels can be obtained by converting the brightness of the output color of light from illuminators; and the obtained electronic current levels can be stored in scalar parameters l_r_ori, l_g_ori, and l_b_ori.

$$A\_cal = \begin{pmatrix} X_{r\_cal} & X_{g\_cal} & X_{b\_cal} \\ Y_{r\_cal} & Y_{g\_cal} & Y_{b\_cal} \\ Z_{r\_cal} & Z_{g\_cal} & Z_{b\_cal} \end{pmatrix} \quad \text{(Eq. 1)}$$

Values of the specific duty cycle for the calibration can be stored in scalar variables DC_r_cal, DC_g_cal, and DC_b_cal. For example, a R(30%)-G(50%)-B(20%) duty cycle can be stored as DC_r_cal=0.3; DC_g_cal=0.5; and DC_b_cal=0.2.

During the calibration, the relative intensities of colors of the produced on the display target can be measured using the internal sensor (136 in FIG. 4); and the measured relative intensities can be stored in a matrix ABC_cal expressed in equation 2.

$$ABC\_cal = \begin{pmatrix} A_{r\_cal} & B_{r\_cal} & C_{r\_cal} \\ A_{g\_cal} & B_{g\_cal} & C_{g\_cal} \\ A_{b\_cal} & B_{b\_cal} & C_{b\_cal} \end{pmatrix} \quad \text{(Eq. 2)}$$

wherein $A_{r\_cal}$, $B_{r\_cal}$, and $C_{r\_cal}$ are the coordinates of the red color; $A_{g\_cal}$, $B_{g\_cal}$ and $C_{g\_cal}$ are the coordinates of the green color; and $A_{b\_cal}$, $B_{b\_cal}$, and $C_{b\_cal}$ are the coordinates of the blue color.

After the above calibration, another measurement of color properties of the display system is performed with the illuminators being operated at the second duty cycle (measurement duty cycle) that comprises red, green, blue, yellow, cyan, and magenta colors. The yellow color is obtained by an overlap of red and green illuminators; the cyan color is obtained by an overlap of green and blue illuminators; and the magenta color is obtained by an overlap of red and blue illuminators. With the measurement duty cycle, calorimetric values measured from the external calorimeter can be stored in matrix A_new as expressed in equation 3. The corresponding readouts of the internal sensor can be stored in matrix ABC_new as expressed in equation 4; and the electronic current for the illuminators in obtaining the colors R, G, B, Y, C, and M can be stored in scalar variables l_r_new, l_g_new, l_b_new, l_y_r_new, l_c_g_new, l_c_g_new, l_c_b_new, l_m_r_new, and l_m_b_new. Specifically, l_y_r_new and l_y_g_new represent the electronic current applied to the illuminators providing red and green colors at a time when both are turned on so as to generate the specific yellow color. These electronic current levels can be used to maintain certain proportionality between the illuminator intensities that make up a color; e.g. l_y_r_new and l_y_g_new can be used to maintain the yellow color point. It is noted that changing the electronic current for the illuminators may also change the brightness ratio of the illuminators, which in turn, may change the white point. To maintain a consistent white point (white color), ratios of the red, green and blue colors, or brightness ratios of the yellow, cyan, and magenta colors may be maintained to be consistent. Values of the measurement duty cycle (RGBYCM) for the calibration can be stored in scalar variables DC_r_new, DC_new, DC_b_new. DC_y_new, DC_v_new, and DC_m_new. For example, a R(10%)-G(20%)-B(20%)-Y (20%)-C(10%)-M(20%) duty cycle can be stored as DC_r_new=0.1; DC_g_new=0.2; DC_b_new=0.2; DC_y_new=0.2; DC_c_new=0.1; and DC_m_new=0.2.

$$A\_new = \begin{pmatrix} X_{r\_new} & X_{g\_new} & X_{b\_new} \\ Y_{r\_new} & Y_{g\_new} & Y_{b\_new} \\ Z_{r\_new} & Z_{g\_new} & Z_{b\_new} \end{pmatrix} \quad \text{(Eq. 3)}$$

$$ABC\_new = \begin{pmatrix} A_{r\_new} & B_{r\_new} & C_{r\_new} \\ A_{g\_new} & B_{g\_new} & C_{g\_new} \\ A_{b\_new} & B_{b\_new} & C_{b\_new} \\ A_{y\_new} & B_{y\_new} & C_{y\_new} \\ A_{c\_new} & B_{c\_new} & C_{c\_new} \\ A_{m\_new} & B_{m\_new} & C_{m\_new} \end{pmatrix} \quad \text{(Eq. 4)}$$

wherein $A_{r\_new}$, $B_{r\_new}$, and $C_{r\_new}$ are color values dynamically measured for the red color by the internal sensor at the display cycle; $A_{g\_new}$, $B_{g\_new}$, and $C_{g\_new}$ are color values dynamically measured for the green color by the internal sensor at the display cycle; $A_{b\_new}$, $B_{b\_new}$, and $C_{b\_new}$ are color values dynamically measured for the blue color; $A_{y\_new}$, $B_{y\_new}$, and $C_{y\_new}$ are color values dynamically measured for the yellow color; $A_{c\_new}$, $B_{c\_new}$, and $C_{c\_new}$ are color values dynamically measured for the cyan color; and $A_{m\_new}$, $B_{m\_new}$, and $C_{m\_new}$ are color values dynamically measured for the magenta color.

With the above calibration and measurement at steps 140 and 142, a color matrix Ncm is computed (step 144), an example of which will be discussed in the following.

Based upon the internal sensor measurements, matrix A_new_est is computed which contains corrections to the calibration using the external calorimeter based on changes in electronic current, temperature, and/or sensor response. The matrix A_new_est is an estimation of what the external calorimeter would measure under the current conditions (e.g. current temperature, electronic current, and duty cycle). It is noted that the current duty cycle is composed of R, G, B, Y, C, and M, which is different from the illuminators that comprises illuminators for R, G, and B colors. Given the fixed electronic current, temperature, and other environmental conditions, the matrix A_new_est estimates what the external calorimeter would measure if the illuminators are operated at the duty cycle of R-G-B-Y-C-M. In other words, matrix A_new_est is a measure or a reverse mapping of the parameters output from the internal sensor measurement (the desired parameters) for the parameters output from the external sensor measurement. Specifically, given a set of desired parameters (e.g. parameters including ABC_new, DC_r_new, DC_g_new, DC_b_new. DC_y_new, DC_v_new, DC_m_new, 1_r_new, 1_g_new, 1_b_new, 1_y_r_new, 1_y_g_new, 1_c_g_new, 1_c_b_new, 1_m_r_new, and 1_m_b_new), the matrix A_new_est maps the given parameters into a set of output parameters that would be measured by the external calorimeter. There are many ways to compute the mapping matrix A_new_est, one of which assumes linear or a predetermined non-linear correlation between the internal sensor readouts and external sensor readouts; and interpolates the measured parameters so as to construct the mapping matrix A_new_est, as set forth in U.S. patent applications "Managing the Color Temperature for a Light Source Array" Ser. No. 11/219,598 filed Sep. 1, 2005, and "Projection Illumination Using Multiple Controlled Light Emitters having Individual Wavelengths" Ser. No. 60/882,637 filed Dec. 29, 2006, the subject matter of each being incorporated herein by reference in its entirety. The matrix A_new_est can be expressed as equation 5.

$$A\_new\_est = \begin{pmatrix} X_{r\_est} & Y_{r\_est} & Z_{r\_est} \\ X_{g\_est} & Y_{g\_est} & Z_{g\_est} \\ X_{b\_est} & Y_{b\_est} & Z_{b\_est} \end{pmatrix} \quad \text{(Eq. 5)}$$

Given the estimated color matrix A_new_est, the color matrix Ncm can be computed, wherein the color matrix is representative of the colors used in the display system. As a way of example, the color matrix Ncm can be computed as follows.

The X, Y, Z values measured by the external calorimeter and stored in A_cal are scaled for each color of light using scaling factors red_actor, green_factor, and blue_factor, respectively. The scaling factors can be calculated from the following equation 6:

$$\left.\begin{aligned} red\_factor &= \frac{ABC\_new \cdot A_{r\_new}}{ABC\_cal \cdot A_{r\_cal}} \times \frac{DC\_r\_new}{DC\_r\_cal} \\ green\_factor &= \frac{ABC\_new \cdot A_{g\_new}}{ABC\_cal \cdot A_{g\_cal}} \times \frac{DC\_g\_new}{DC\_g\_cal} \\ blue\_factor &= \frac{ABC\_new \cdot A_{b\_new}}{ABC\_cal \cdot A_{b\_cal}} \times \frac{DC\_b\_new}{DC\_b\_cal} \end{aligned}\right\} \quad \text{(Eq. 6)}$$

Considering equations 4 and 2, equation 6 can be reduced to the following equation 7.

$$\left.\begin{aligned} red\_factor &= \frac{A_{r\_new}}{A_{r\_cal}} \times \frac{DC\_r\_new}{DC\_r\_cal} \\ green\_factor &= \frac{A_{g\_new}}{A_{g\_cal}} \times \frac{DC\_g\_new}{DC\_g\_cal} \\ blue\_factor &= \frac{A_{b\_new}}{A_{b\_cal}} \times \frac{DC\_b\_new}{DC\_b\_cal} \end{aligned}\right\} \quad \text{(Eq. 7)}$$

The X, Y, Z values for each color of light are scaled into X_red, Y_red, and Z_red, which can be expressed as:

$$\left.\begin{aligned} X\_red &= A\_new\_est \cdot X_{r\_est} \times red\_factor \\ Y\_red &= A\_new\_est \cdot Y_{r\_est} \times red\_factor \\ Z\_red &= A\_new\_est \cdot Z_{r\_est} \times red\_factor \\ X\_green &= A\_new\_est \cdot X_{g\_est} \times green\_factor \\ Y\_green &= A\_new\_est \cdot Y_{g\_est} \times green\_factor \\ Z\_green &= A\_new\_est \cdot Z_{g\_est} \times green\_factor \\ X\_blue &= A\_new\_est \cdot X_{b\_est} \times blue\_factor \\ Y\_blue &= A\_new\_est \cdot Y_{b\_est} \times green\_factor \\ Z\_blue &= A\_new\_est \cdot Z_{b\_est} \times green\_factor \end{aligned}\right\} \quad \text{(Eq. 8)}$$

wherein A_new_est.$X_{r\_est}$, A_new_est. $Y_{r\_est}$, and A_new_est.$Z_{r\_est}$ are the X, Y, Z coordinates of the red color component in the computed A_new_est matrix. A_new_est.$X_{g\_est}$, A_new_est.$Y_{g\_est}$, and A_new_est.$Z_{g\_est}$ are the X, Y, Z coordinates of the green color component in the computed A_new_est matrix; and A_new_est.$X_{b\_est}$, A_new_est.$Y_{b\_est}$, and A_new_est.$Z_{b\_est}$ are the X, Y, Z coordinates of the blue color component in the computed A_new_est matrix.

Considering matrix A_new_est in equation 5 and the scaling factors in equation 7, equation 8 can be reduced to equation 9:

$$\left.\begin{aligned}
\text{X\_red} &= X_{r\_est}\times\frac{A_{r\_new}}{A_{r\_cal}}\times\frac{\text{DC\_r\_new}}{\text{DC\_r\_cal}}\\
\text{Y\_red} &= Y_{r\_est}\times\frac{A_{r\_new}}{A_{r\_cal}}\times\frac{\text{DC\_r\_new}}{\text{DC\_r\_cal}}\\
\text{Z\_red} &= Z_{r\_est}\times\frac{A_{r\_new}}{A_{r\_cal}}\times\frac{\text{DC\_r\_new}}{\text{DC\_r\_cal}}\\
\text{X\_green} &= X_{g\_est}\times\frac{A_{g\_new}}{A_{g\_cal}}\times\frac{\text{DC\_g\_new}}{\text{DC\_g\_cal}}\\
\text{Y\_green} &= Y_{g\_est}\times\frac{A_{g\_new}}{A_{g\_cal}}\times\frac{\text{DC\_g\_new}}{\text{DC\_g\_cal}}\\
\text{Z\_green} &= Z_{g\_est}\times\frac{A_{g\_new}}{A_{g\_cal}}\times\frac{\text{DC\_g\_new}}{\text{DC\_g\_cal}}\\
\text{X\_blue} &= X_{b\_est}\times\frac{A_{b\_new}}{A_{b\_cal}}\times\frac{\text{DC\_b\_new}}{\text{DC\_b\_cal}}\\
\text{Y\_blue} &= Y_{b\_est}\times\frac{A_{b\_new}}{A_{b\_cal}}\times\frac{\text{DC\_b\_new}}{\text{DC\_b\_cal}}\\
\text{Z\_blue} &= Z_{b\_est}\times\frac{A_{b\_new}}{A_{b\_cal}}\times\frac{\text{DC\_b\_new}}{\text{DC\_b\_cal}}
\end{aligned}\right\}\qquad\text{(Eq. 9)}$$

Scaling is also performed for the additional colors (yellow, cyan, and magenta) by using the following equation:

$$\begin{aligned}
&\text{X\_yellow} = \text{X\_red}\times(\text{DC\_y\_new}/\text{DC\_r\_new})\times\text{l\_y\_r\_new} + \text{X\_green}\times(\text{DC\_y\_new}/\text{DC\_g\_new})\times\text{l\_y\_g\_new} \qquad\text{(Eq. 10)}\\
&\text{Y\_yellow} = \text{Y\_red}\times(\text{DC\_y\_new}/\text{DC\_r\_new})\times\text{l\_y\_r\_new} + \text{Y\_green}\times(\text{DC\_y\_new}/\text{DC\_g\_new})\times\text{l\_y\_g\_new}\\
&\text{Z\_yellow} = \text{Z\_red}\times(\text{DC\_y\_new}/\text{DC\_r\_new})\times\text{l\_y\_r\_new} + \text{Z\_green}\times(\text{DC\_y\_new}/\text{DC\_g\_new})\times\text{l\_y\_g\_new}\\
&\text{X\_cyan} = \text{X\_cyan}\times(\text{DC\_c\_new}/\text{DC\_g\_new})\times\text{l\_c\_g\_new} + \text{X\_cyan}\times(\text{DC\_c\_new}/\text{DC\_b\_new})\times\text{l\_c\_b\_new}\\
&\text{Y\_cyan} = \text{Y\_cyan}\times(\text{DC\_c\_new}/\text{DC\_g\_new})\times\text{l\_c\_g\_new} + \text{Y\_cyan}\times(\text{DC\_c\_new}/\text{DC\_b\_new})\times\text{l\_c\_b\_new}\\
&\text{Z\_cyan} = \text{Z\_cyan}\times(\text{DC\_c\_new}/\text{DC\_g\_new})\times\text{l\_c\_g\_new} + \text{Z\_cyan}\times(\text{DC\_c\_new}/\text{DC\_b\_new})\times\text{l\_c\_b\_new}\\
&\text{X\_magenta} = \text{X\_magenta}\times(\text{DC\_m\_new}/\text{DC\_r\_new})\times\text{l\_m\_r\_new} + \text{X\_magenta}\times(\text{DC\_m\_new}/\text{DC\_b\_new})\times\text{l\_m\_b\_new}\\
&\text{Y\_magenta} = \text{Y\_magenta}\times(\text{DC\_m\_new}/\text{DC\_r\_new})\times\text{l\_m\_r\_new} + \text{Y\_magenta}\times(\text{DC\_m\_new}/\text{DC\_b\_new})\times\text{l\_m\_b\_new}\\
&\text{Z\_magenta} = \text{Z\_magenta}\times(\text{DC\_m\_new}/\text{DC\_r\_new})\times\text{l\_m\_r\_new} + \text{Z\_magenta}\times(\text{DC\_m\_new}/\text{DC\_b\_new})\times\text{l\_m\_b\_new}
\end{aligned}$$

The scaled X, Y, Z values of red, green, blue, yellow, cyan, and magenta colors of light are then populated in the color matrix Ncm as shown in the following:

$$Ncm = \begin{pmatrix}
\text{X\_red} & \text{X\_green} & \text{X\_blue} & \text{X\_yellow} & \text{X\_cyan} & \text{X\_magenta}\\
\text{Y\_red} & \text{Y\_green} & \text{Y\_blue} & \text{Y\_yellow} & \text{Y\_cyan} & \text{Y\_magenta}\\
\text{Z\_red} & \text{Z\_green} & \text{Z\_blue} & \text{Z\_yellow} & \text{Z\_cyan} & \text{Z\_magenta}
\end{pmatrix}$$

The generated color matrix Ncm can then be used for constructing a color correction matrix (step 146 in FIG. 5), the output of which goes into a table such as a BrilliantColor™ color mapping table, as set froth in U.S. patent application "System and Method for Computing Color Correction Coefficients" Ser. No. 11/588,921 filed Oct. 27, 2006, the subject matter being incorporated herein by reference in its entirety. The built color correction matrix can be used for color control in display applications, which will be discussed afterwards.

As an alternative example to the above discussed method for obtaining the color matrix Ncm, measured colors can be kept track of by using the internal sensor only; and the color values measured by the internal sensor are converted to X, Y, Z values using a prediction mechanism, which in turn is used for color control, as will be discussed in the following. At calibration, calorimetric variation of the solid-state light illuminators (read from the external calorimeter) used in the display system with current level (intensity) can be measured; and the measured data can be stored in matrix T as X, Y, Z tristimulus values. Internal sensor variations with electronic current levels (intensity) of the solid-state illuminators are also measured; and the measured data can be stored in matrix C of A, B, C values. For example, by ramping up the electronic current from 0 to a pre-determined upper threshold electronic current level for a given duty cycle (e.g. R-G-B duty cycle), XYZ values can be measured from the external calorimeter; and the ABC values can be measured from the internal sensor. The measured XYZ and ABC values can be respectively written into XYZ and ABC tables. The XYZ table can comprise three columns and N numbers of rows with the columns correspond to X, Y, and Z values; and the rows correspond to the measurements of X, Y, and Z at individual electronic sample currents. The same for the ABC table wherein the columns correspond to A, B, and C values; and the rows correspond to the measurements of A, B, and C at individual electronic sample currents. Alternatively, each XYZ and ABC table can include non-linear components. For example, the ABC table may comprise $A^2$, $B^2$, and $C^2$ or other higher order non-linear components of the A, B, and C values. The obtained XYZ and ABC tables can be converted to matrices T and C, respectively. Matrices T and C can be expressed as follows:

$$C = \begin{pmatrix} A_1 & B_1 & C_1\\ A_2 & B_2 & C_2\\ \vdots & \vdots & \vdots\\ A_n & B_n & C_n \end{pmatrix}, \text{ and } T = \begin{pmatrix} X_1 & Y_1 & Z_1\\ X_2 & Y_2 & Z_2\\ \vdots & \vdots & \vdots\\ X_n & Y_n & Z_n \end{pmatrix}$$

By following the same or similar calibration and measurement processes as discussed above with reference to steps 140 and 142 in FIG. 5, variables ABC_new, DC_r_new, DC_g_new, DC_b_new, DC_y_new, DC_c_new, DC_m_new, ABC_cal, DC_r_cal, DC_g_cal, DC_b_cal, l_r_ori, l_g_ori, l_b_ori, A_new, l_r_new, l_g_new, l_b_new, l_r_new, l_y_g_new, l_c_g_new, l_c_b_new, l_m_r_new, and l_m_b_new can be obtained, which will not be repeated herein.

Based on matrices C and T, an ABC-to-XYZ color conversion matrix B can be computed. The conversion matrix B, can be accomplished in many ways. In one example, the conversion matrix B can be calculated as:

$$B=E\{T\cdot C^T\}\cdot\{E[CC^T]\}^{-1} \quad \text{(Eq. 11)}$$

wherein the superscript 'T' is the transpose operator; E is the expectation operator over the various elements in the two matrices C and T; and the superscript "−1" is a matrix inverse operator. The computed conversion matrix B can then be stored in firmware (such as pre-processor 116 in FIG. 2), which takes an input A, B, C values (e.g. the values measured by the internal sensor) and estimates and outputs X, Y, Z values that would have resulted in such an A, B, C measurement.

Given the above conversion matrix B and measured ABC_new, the color matrix Ncm can then be computed. Specifically, the X, Y Z values for each color of light can be scaled as follows.

$$\text{XYZ\_red} = B\cdot\text{ABC\_new}\cdot A_r\cdot\text{DC\_r\_new} \quad \text{(Eq. 12)}$$

$$\text{XYZ\_green} = B\cdot\text{ABC\_new}\cdot\text{A\_g}\cdot\text{DC\_g\_new}$$

$$\text{XYZ\_blue} = B\cdot\text{ABC\_new}\cdot\text{A\_b}\cdot\text{DC\_b\_new}$$

$$\text{XYZ\_yellow} = B\cdot\begin{pmatrix}\text{ABC\_new}\cdot\text{A\_r}\cdot\text{DC\_y\_new}\cdot\text{l\_y\_r\_new}+\\ \text{ABC\_new}\cdot\text{A\_g}\cdot\text{DC\_y\_new}\cdot\text{l\_y\_g\_new}\end{pmatrix}$$

$$\text{XYZ\_cyan} = B\cdot\begin{pmatrix}\text{ABC\_new}\cdot\text{A\_g}\cdot\text{DC\_c\_new}\cdot\text{l\_c\_g\_new}+\\ \text{ABC\_new}\cdot\text{A\_b}\cdot\text{DC\_c\_new}\cdot\text{l\_c\_b\_new}\end{pmatrix}$$

$$\text{XYZ\_magenta} = B\cdot\begin{pmatrix}\text{ABC\_new}\cdot\text{A\_r}\cdot\text{DC\_m\_new}\cdot\text{l\_m\_r\_new}+\\ \text{ABC\_new}\cdot\text{A\_b}\cdot\text{DC\_m\_new}\cdot\text{l\_m\_b\_new}\end{pmatrix}$$

In equation 12, XYZ_red, XYZ_green, XYZ_blue, XYZ_yellow, XYZ_cyan, and XYZ_magenta are scaled vectors of X, Y Z values of red, green, blue, yellow, cyan, and magenta colors of light. Dot '·' between two terms is the multiply operator.

Given the above computed vectors, the color matrix Ncm can be obtained by populating the XYZ_red, XYZ_green, XYZ_blue, XYZ_yellow, XYZ_cyan, and XYZ_magenta vectors; and the obtained color matrix can be expressed as:

$$Ncm = \begin{pmatrix}\text{X\_red} & \text{X\_green} & \text{X\_blue} & \text{X\_yellow} & \text{X\_cyan} & \text{X\_magenta}\\ \text{Y\_red} & \text{Y\_green} & \text{Y\_blue} & \text{Y\_yellow} & \text{Y\_cyan} & \text{Y\_magenta}\\ \text{Z\_red} & \text{Z\_green} & \text{Z\_blue} & \text{Z\_yellow} & \text{Z\_cyan} & \text{Z\_magenta}\end{pmatrix}$$

The generated color matrix Ncm can then be used for building a color mapping table (step 146 in FIG. 5), such as a BrilliantColor™ color mapping table, as set froth in U.S. patent application "System and Method for Computing Color Correction Coefficients" Ser. No. 11/588,921 filed Oct. 27, 2006, the subject matter being incorporated herein by reference in its entirety. The built color mapping table can be used for color control in displaying applications, as shown in FIG. 3.

In the example as shown in FIG. 3, color table 110 is capable of outputting a set of color values (red', green', blue', yellow, cyan, and magenta) based on the set of input color values (red, green, and blue), wherein the output red' green' and blue' may or may not equal the corresponding red, green, and blue values. With the color table, transformation from the set of input color values to the set of output color values can be made insensitive to calorimetric changes in the solid-state light emitting devices, or to be insensitive to the effect of color shift. Specifically, as the calorimetric properties of the illuminators vary, the color mapping tables stay independent and do not affect linearity or any color-related manifestation. For example, if C1 is cyan; for a given input R_in, G_in, B_in with the definition that Temp=f(G_in,B_in), it can be obtained that R_out=R_in; G_out=G_in_f'(Temp, hue); B_out=B_in_f'(Temp, hue); Y_out=0; C_out=Temp; and M_out=0, where hue denotes the hue of the input color, f and f' are customizable parameters, as set forth in "Generation of System Independent Signals to Drive Multiprimary Systems" Ser. No. 60/889,645 filed Feb. 13, 2007, the subject matter being incorporated herein by reference in its entirety. It is noted that the color mapping table can be in many forms, such as a two dimensional lookup table, a three-dimensional lookup table (e.g. a BrilliantColor™ table) and other desired forms. The color mapping table can be implemented in a dedicated electronic circuit or a standalone software module stored in a computer-readable medium, wherein the electronic circuit can be an application-specific-integrated circuit, a digital-signal-processor (DSP), a field-programmable-gate-array, or any other suitable circuits. Once the color mapping table is constructed, it needs not to be changed during the following image display applications. One single color mapping table as constructed above can be sufficient for a display system, even such display system is to be used in the presence of possible variations due to illuminators and/or duty cycles and/or other related factors.

During an Image Display Application

During a display application for desired images, (A, B, C) and (X, Y, Z) data can be monitored. As an example, (A, B, C) data can be dynamically measured by the internal sensor; while the (X, Y, z) data can be obtained from the measured (A, B, C) data and the correlation between the (X, Y, Z) and (A, B, C) data established during the color mapping construction stage as discussed above. Alternatively, both (X, Y, Z) and (A, B, C) data can be measured and monitored when both external calorimeter and internal sensor are provided by the display system or available by users. The monitors (X, Y, Z) and (A, B, C) data are then used for calculating matrix Tcm by using the same calculation processes for color matrix Ncm as discussed above (Tcm is equivalent to Ncm). The generated Tcm is then used as the input for the color mapping table (110 in FIG. 2) based on algorithms outlined in U.S. patent application "System and Method for Computing Color Correction Coefficients" Ser. No. 11/588,921 filed Oct. 27, 2006. It is noted that measurements of (A, B, C) (and/or (X, Y, Z) data) can be performed based on a predetermined schedule. For example, the measurements can be performed for every image frame or any desired numbers of frames in a sequence of video frames. Alternatively, the measurements can be performed continuously while calculations of the Ncm matrix are triggered when the measured (A, B, C) (and/or (X, Y, Z)) data are above a pre-determined threshold(s). It is further noted that during the color mapping table construction, (A, B, C) and (X, Y, Z) can be obtained from sample images; while during the display applications, (A, B, C) (and/or (X, Y, Z) data are obtained from images customers desire to view.

As a way of example with reference to the display system in FIG. 2, the measured (A, B, C) data, as well as (X, Y, Z) data that are estimated from the (A, B, C) data or measured using an external sensor, can be delivered to color control unit 138 (in FIG. 4), of which pre-processor 116 can be a member functional module. The pre-processor generates the set of parameters based on the (X, Y, Z) and (A, B, C) data and the derived matrix Tcm; and delivers the generated parameters to the color mapping table. The color mapping table outputs a set of parameters based on the set of input parameters for generating bitplanes, as set forth in "System and Method for Computing Color Correction Coefficients" Ser. No. 11/588,921 filed Oct. 27, 2006.

It will be appreciated by those of skilled in the art that a new and useful color control method for use in display systems that employ spatial light modulators has been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

We claim:

1. A method for use in a display system, comprising:

obtaining a calorimetric property characterizing the display system and a color intensity characterizing light illuminating a light valve of the display system, at least one of obtaining the calorimetric property and obtaining a color intensity is performed based on a pre-determined schedule;

deriving an image data based on an image to be produced, the obtained calorimetric property and the color intensity; and producing the image using the image data.

2. The method of claim 1, wherein the step of deriving the image data further comprises:

generating a set of input parameters for a color mapping table based on the calorimetric property and the color intensity;

mapping the generated input parameters by the color mapping table into a set of output parameters; and deriving the image data based on the image to be produced and the set of output parameters.

3. The method of claim 2, further comprising a step of constructing the color mapping table, further comprising:

measuring a first set of calorimetric properties characterizing the display system and a first set of color intensities characterizing light illuminating the light valve;

measuring a second set of calorimetric properties characterizing the display system and a second set of color intensities characterizing light illuminating the light valve;

estimating a set of parameters based on the measured first and second sets of calorimetric properties and color intensity; and constructing the color mapping table based on the estimated set of parameters.

4. The method of claim 3, wherein the color mapping table is a two-dimensional lookup table or a three-dimensional lookup table.

5. The method of claim 3, further comprising:

establishing a correlation between the calorimetric properties of the display system and the color intensities of the light illuminating the light valve of the display system.

6. The method of claim 5, wherein the step of obtaining the calorimetric property and the color intensity further comprises:

measuring the color intensity using an internal sensor; and estimating the calorimetric property based on the measured color intensity and the established correlation.

7. The method of claim 6, wherein the internal sensor is disposed such that said internal sensor is capable of measuring the light into or from the light valve.

8. The method of claim 7, wherein the internal sensor is disposed on or embedded in the light valve.

9. The method of claim 1, wherein the step of obtaining the color intensity and obtaining calorimetric property are both performed based on a pre-determined schedule.

10. The method of claim 9, wherein the step of obtaining the calorimetric property and color intensity is performed continuously while the step of generating a set of input parameters is triggered when the obtained calorimetric property or color intensity is beyond a pre-determined threshold.

11. The method of claim 1, wherein the step of producing the image using the image data further comprises:

sequentially directing a set of color light beams to a light valve that is a spatial light modulator; and displaying image data that are bitplanes corresponding to the color light beams illuminating the light valve.

12. The method of claim 11, wherein the set of color light beams is generated by a set of solid-state illuminators.

13. The method of claim 12, wherein the solid-state illuminators are LEDs or lasers.

14. The method of claim 12, wherein the number of solid-state illuminators is more than, equal to, or less than the number of color light beams illuminating the light valve.

15. The method of claim 11, wherein the spatial light modulator comprises an array of reflective and deflectable micromirrors.

16. The method of claim 1, wherein the light valve is a LCD panel, a silicon crystal reflective display panel, a liquid-crystal-on-silicon display panel or an interferometric modulator based display panel.

17. The method of claim 2, wherein the step of generating a set of input parameters for the color mapping table based on the calorimetric property and the color intensity is performed by a dedicated electronic circuit.

18. The method of claim 17, wherein the dedicated electronic circuit is an application-specific-integrated-circuit, a field-programmable-gate-array, or a digital-signal-processor (DSP).

19. A method for use in constructing a color mapping table that is usable in an imaging system, the method comprising:

measuring a first set of calorimetric properties characterizing the imaging system and a first set of color intensities characterizing light illuminating a light valve of the imaging system;

measuring a second set of calorimetric properties characterizing the imaging system and a second set of color intensities characterizing light illuminating the light valve;

estimating a set of parameters based on the measured first and second sets of calorimetric properties and color intensities; and constructing the color mapping table based on the estimated set of parameters.

20. The method of claim 19, wherein the color mapping table is a two-dimensional lookup table or a three-dimensional lookup table.

21. A display system, comprising:

an internal sensor capable of measuring an intensity of a color illuminating a light valve of the display system;

a pre-processing unit having a set of input in connection with an image source, an external calorimeter, and the internal sensor for calculating a set of parameters for a color mapping table based on the measurements of the external calorimeter, the internal sensor, and an image to be produced;

an image data module in connection with an output of the color mapping table for deriving a set of image data; and a light valve comprising an array of individually controllable pixels for displaying the image data so as to generate the image on a screen.

22. The system of claim 21, wherein the light valve is a spatial light modulator, a LCD panel, a silicon crystal reflective display panel, or an interferometric modulator.

23. The system of claim 21, further comprising: a set of solid-state illuminators that are LEDs or lasers.

24. The system of claim 21, wherein the system is a rear projector, a front projector, or a rear-projection TV.

25. The system of claim 21, wherein the internal sensor is disposed such that said internal sensor is capable of measuring the light into or from the light valve.

* * * * *